UNITED STATES PATENT OFFICE.

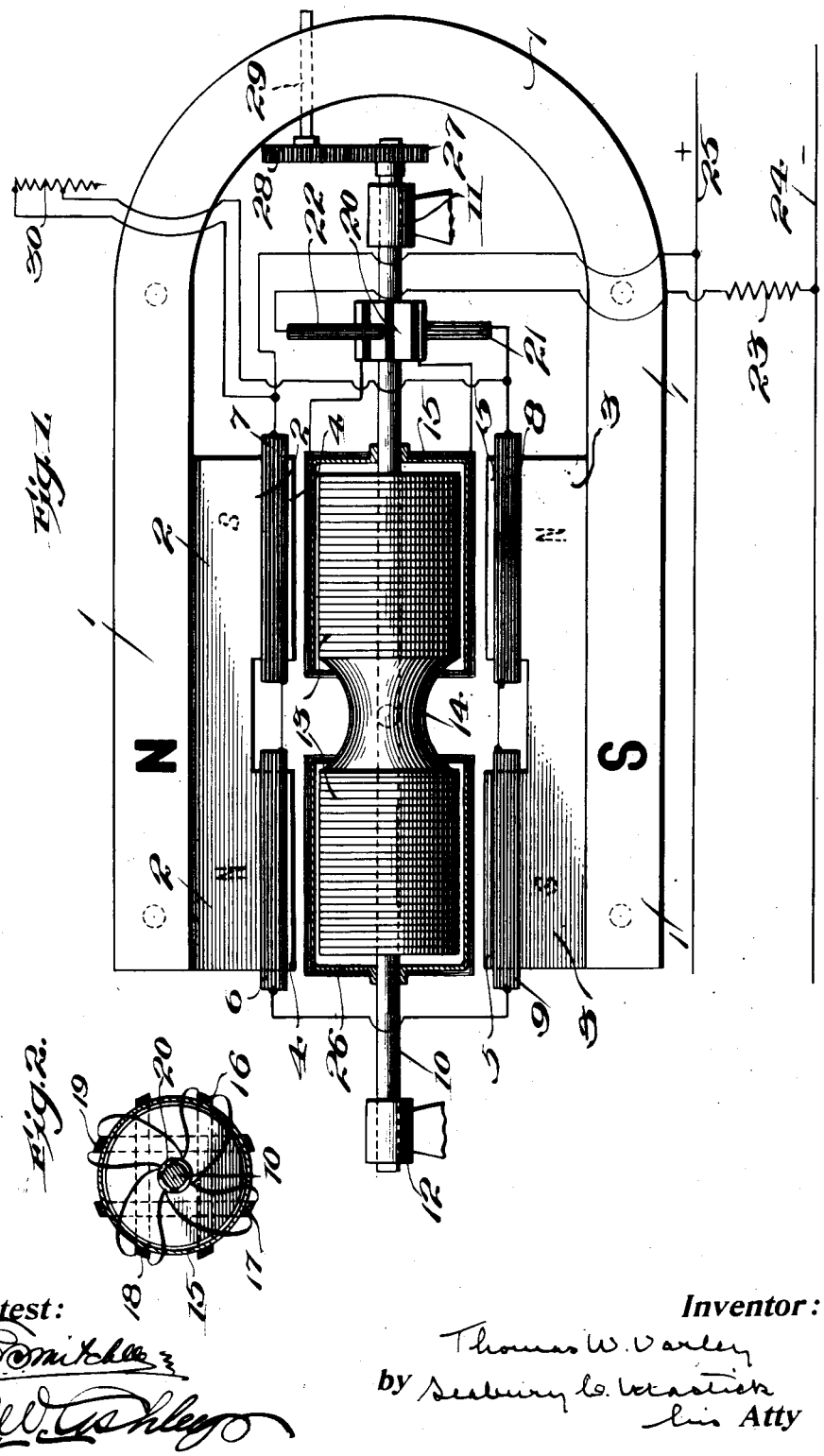

THOMAS W. VARLEY, OF NEW YORK, N. Y.

ELECTRICAL APPARATUS.

No. 869,602.  Specification of Letters Patent.  Patented Oct. 29, 1907.

Application filed February 21, 1906. Serial No. 302,258.

*To all whom it may concern:*

Be it known that I, THOMAS W. VARLEY, a citizen of the United States, residing in the borough of Manhattan, city of New York, State of New York, have invented a new and useful Improvement in Electrical Apparatus, of which the following is a specification.

My invention relates to an electrical apparatus adapted to operate at a constant speed ratio irrespective of changes of the operating circuit.

In the following I have described with reference to the accompanying drawings a structure illustrating one embodiment of my invention, the features thereof being more particularly pointed out hereinafter in the claims.

In the drawings Figure 1 is a sectional plan view of the embodiment of my invention illustrated which is adapted to operate as a constant speed motor. Fig. 2 is a detail view showing the windings of the movable coil and their connections to the commutator as a regular two pole armature.

Similar numerals of reference indicate similar parts throughout the several views.

1 represents a substantially constant magnet either electro or permanent, here illustrated as a permanent magnet, having pole pieces 2 and 3 of laminated soft iron plates. In the form illustrated each pole piece is provided with projections 4, 4 and 5, 5 respectively to receive windings 6, 7, 8 and 9 illustrated as connected together in series and constituting the fixed coil. A shaft 10 is supported in bearings 11 and 12 between the poles of magnet 1. Surrounding the shaft and preferably supported independently thereof is a core 13 illustrated as round in cross section and formed of laminated soft iron plates. The core 13 is preferably cut away at 14 in order to afford convenient means for support.

Mounted on shaft 10 and surrounding one end of core 13 is a cup 15 of non conducting material carrying windings 16, 17, 18 and 19 constituting the movable coil, thus forming an armature, said windings being preferably connected in series with each other and connected with the commutator 20 on shaft 10 in the usual way as shown in Fig. 2. The commutator 20 is provided with brushes 21 and 22 connected by way of windings 6, 7, 8 and 9 and through a suitable resistance 23 to mains 24 and 25. Mounted on shaft 10 at the other end from cup 15 and surrounding the other end of core 13 is a cup 26 of some conducting material, preferably aluminium. At the outer end of shaft 10 is a suitable transmitting device such as a gear wheel 27 to translate the motion as desired. In the form illustrated gear 27 meshes with gear 28 on shaft 29 to act as a constant speed motor.

The windings constituting the fixed coil and the moving coil are connected in the same circuit, and in the form illustrated they are all in series.

The operation of the device illustrated is as follows:

The current enters the fixed coil and magnetizes the pole pieces on which they are supported tending to form poles as marked in dotted lines on Fig. 1 S, N, S, N. In normal operation the magnetism of the pole pieces supporting windings 7 and 8 is decreased while that of those supporting windings 6 and 9 is increased because of the currents passing through the windings and the way in which the windings are wound. The current in the armature causes the armature to rotate dragging with it the cup 26 until a speed is reached such that the rotating torque exerted by the armature is balanced by the retarding torque exerted by the cup 26. The retarding torque is caused by the induced currents set up in the cup which thus acts as a retarder. As the current in the circuit decreases the armature current decreases tending to decrease the rotating torque. At the same time the pole pieces supporting windings 7 and 8, because of the decrease of current, will increase in strength tending to cause the rotating torque to be constant. The pole pieces supporting windings 6 and 9, because of the decrease of current, decrease in strength tending to cause the retarding torque of the cup to decrease. These forces are so balanced that the speed of the motor as a whole is kept constant. Conversely for increase of current the functions mentioned are reversed, the speed of the motor remaining constant.

An adjustable resistance 30 may be placed in shunt across the fixed coil, as illustrated, or across the armature coil in order to adjust or control the speed of rotation or the indication. The total magnetic flux of the magnet remains constant.

The principle of the invention as shown and described is applicable to either alternating or direct currents, and may be utilized in other ways than as illustrated, for example as an indicating instrument, as is clear to any one skilled in the art.

It is obvious that the details illustrated may be considerably varied and parts and functions transposed without departing from the spirit of my invention, and I do not restrict myself to any of the details as shown and described.

What I claim and desire to secure by Letters Patent of the United States is:—

1. In an apparatus of the character described a magnet substantially constant irrespective of variations of potential, a stationary coil adapted to shift the lines of force of the magnetic field without varying the total magnetism of said field and a movable coil in the magnetic field, said coils being connected in the same circuit, the shifting of the lines of force in the magnetic field causing the flux through the moving coil to vary inversely as the current strength.

2. In an apparatus of the character described a magnet substantially constant irrespective of variations of potential, a stationary coil adapted to shift the lines of force of the magnetic field without varying the total magnetism of said field and a movable coil, said coils being connected in series, the shifting of the lines of force in the magnetic field causing the flux through the moving coil to vary inversely as the current strength.

3. In an apparatus of the character described a magnet substantially constant irrespective of variations of potential, a stationary coil adapted to shift the lines of force of the magnetic field without varying the total magnetism of said field, a movable coil in the magnetic field and an adjustable resistance across either of said coils, said coils being connected in the same circuit, the shifting of the lines of force in the magnetic field causing the flux through the moving coil to vary inversely as the current strength.

4. In an apparatus of the character described a magnet, a stationary coil adapted to shift the lines of force of the magnetic field without varying the total magnetism of said field and a movable coil and a retarding device in the magnetic field, the shifting of the lines of force in the magnetic field causing the flux through the movable coil and the retarding device to vary inversely to each other.

5. In an apparatus of the character described a magnet, a stationary coil adapted to shift the lines of force of the magnetic field without varying the total magnetism of said field, a shaft located in said field and a movable coil and a retarding device on said shaft, the shifting of the lines of force in the magnetic field causing the flux through the movable coil and the retarding device to vary inversely to each other so that the speed of said shaft is substantially constant.

6. In an apparatus of the character described a magnet substantially constant irrespective of variations of potential, a stationary coil adapted to shift the lines of force of the magnetic field without varying the total magnetism of said field and a movable coil in the magnetic field, said coils being connected in the same circuit, the shifting of the lines of force in the magnetic field causing the flux through the movable coil to vary inversely as the current strength, the torque of the moving coil remaining substantially constant irrespective of variations of potential.

In witness whereof I have hereunto signed my name in the presence of two subscribing witnesses.

THOMAS W. VARLEY.

Witnesses:
ROBERT W. ASHLEY,
SEABURY C. MASTICK.